United States Patent
Koyata et al.

(10) Patent No.: US 6,392,964 B2
(45) Date of Patent: *May 21, 2002

(54) DIGITAL SIGNAL RECORDING/REPRODUCING APPARATUS AND REMOTE CONTROLLING APPARATUS CAPABLE OF DISPLAYING PROGRAM NAMES IN A PLURALITY OF DISPLAY FIELDS USING DIFFERENT CHARACTER SYMBOLS AND RECORDING AND REPRODUCING METHODS THEREOF

(75) Inventors: Tomohiro Koyata; Yoshiyuki Takaku; Motohiko Akiyama, all of Tokyo; Hiroshi Yamaguchi, Nagano; Shinji Isozaki, Nagano; Hiroshi Mizuno, Nagano, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/149,431

(22) Filed: Sep. 8, 1998

(30) Foreign Application Priority Data

Sep. 19, 1997 (JP) .............................................. 9-255550

(51) Int. Cl.⁷ ................................................ G11B 17/22
(52) U.S. Cl. ..................... 369/30.04; 340/3.5; 345/703; 386/105; 711/111
(58) Field of Search .............................. 369/32, 369.04; 340/3.5; 711/111; 345/703; 386/106, 185

(56) References Cited

U.S. PATENT DOCUMENTS

| | | | |
|---|---|---|---|
| 4,658,374 A | * | 4/1987 | Tanimoto et al. ............ 364/900 |
| 5,666,451 A | | 9/1997 | Kim .............................. 386/97 |
| 5,689,704 A | * | 11/1997 | Yoshida et al. .............. 707/104 |
| 5,719,841 A | * | 2/1998 | Kitayama ..................... 369/59 |
| 5,724,322 A | * | 3/1998 | Kondo et al. ................. 369/32 |
| 5,829,050 A | * | 10/1998 | Maeda ......................... 711/171 |
| 5,870,583 A | * | 2/1999 | Maeda ..................... 369/32 X |
| 5,901,119 A | * | 5/1999 | Inoue ........................... 369/32 |
| 5,905,697 A | * | 5/1999 | Yaamashita ................... 369/32 |
| 5,959,539 A | * | 9/1999 | Adolph et al. .......... 340/825.07 |
| 5,999,950 A | * | 12/1999 | Krueger et al. .............. 707/535 |
| 6,011,761 A | * | 1/2000 | Inoue ........................... 369/32 |

FOREIGN PATENT DOCUMENTS

| | | | | |
|---|---|---|---|---|
| EP | 0262954 A2 | | 4/1988 | ........... G11B/19/02 |
| EP | 0595358 A2 | | 5/1994 | ........... G11B/27/24 |
| EP | 0606157 A2 | | 7/1994 | ........... G11B/27/10 |
| EP | 0651383 A1 | | 5/1995 | ........... G11B/11/10 |
| GB | 2014765 A | | 8/1979 | ........... G06F/15/38 |
| GB | 2043975 A | | 10/1980 | ........... G06F/15/38 |
| GB | 2131583 A | | 6/1984 | ........... G06F/15/38 |
| GB | 2180973 A | | 4/1987 | ........... G06F/15/20 |
| GB | 2226902 A | | 7/1990 | ............. H03J/9/00 |
| GB | 2295474 A | | 5/1996 | ........... G06F/17/28 |
| WO | WO 95/04990 | * | 2/1995 | |
| WO | 95/12276 | | 5/1995 | ........... H04N/5/765 |

* cited by examiner

Primary Examiner—Aristotelis M. Psitos
(74) Attorney, Agent, or Firm—Oblon, Spivak, McClelland, Maier & Neustadt, P.C.

(57) ABSTRACT

The present invention relates to a recording apparatus and a reproducing apparatus that record/reproduce a digital audio signal to/from a rewritable magnetic optical disc. With an operating portion and a displaying portion having an input field with a plurality of lines, character information such as titles of individual programs in a plurality of character formats can be input at a time.

12 Claims, 16 Drawing Sheets

Fig. 3

| | 16 bits | | 16 bits | |
|---|---|---|---|---|
| | MSB      LSB | MSB      LSB | MSB      LSB | MSB      LSB |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | cluster H | cluster L | 00000000 | 00000010 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | Maker code | Model code | First TNO | Last TNO |
| 8 | 00000000 | 00000000 | 00000000 | Used Sectors |
| 9 | 00000000 | 00000000 | 00000000 | 00000000 |
| 10 | 00000000 | 00000000 | 00000000 | Disc Serial No. |
| 11 | Disc | ID | P-DFA | P-EMPTY |
| 12 | P-FRA | P-TNO1 | P-TNO2 | P-TNO3 |
| 13 | P-TNO4 | P-TNO5 | P-TNO6 | P-TNO7 |
| 74 | P-TNO248 | P-TNO249 | P-TNO250 | P-TNO251 |
| 75 | P-TNO252 | P-TNO253 | P-TNO254 | P-TNO255 |
| 76 | 00000000 | 00000000 | 00000000 | 00000000 |
| 77 | 00000000 | 00000000 | 00000000 | 00000000 |
| 78 | START ADDRESS | | | TRACK MODE |
| 79 | END ADDRESS | | | LINK INFO |
| 80 | START ADDRESS | | | TRACK MODE |
| 81 | END ADDRESS | | | LINK INFO |
| 82 | START ADDRESS | | | TRACK MODE |
| 83 | END ADDRESS | | | LINK INFO |
| 580 | START ADDRESS | | | TRACK MODE |
| 581 | END ADDRESS | | | LINK INFO |
| 582 | START ADDRESS | | | TRACK MODE |
| 583 | END ADDRESS | | | LINK INFO |
| 584 | START ADDRESS | | | TRACK MODE |
| 585 | END ADDRESS | | | LINK INFO |
| 586 | START ADDRESS | | | TRACK MODE |
| 587 | END ADDRESS | | | LINK INFO |

Fig. 5

| | 16 bits || 16 bits ||
|---|---|---|---|---|
| | MSB     LSB | MSB     LSB | MSB     LSB | MSB     LSB |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | cluster H | cluster L | 00000001 | 00000010 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | 00000000 | 00000000 | 00000000 | 00000000 |
| 8 | 00000000 | 00000000 | 00000000 | 00000000 |
| 9 | 00000000 | 00000000 | 00000000 | 00000000 |
| 10 | 00000000 | 00000000 | 00000000 | 00000000 |
| 11 | 00000000 | 00000000 | 00000000 | P-EMPTY |
| 12 | 00000000 | P-TNA1 | P-TNA2 | P-TNA3 |
| 13 | P-TNA4 | P-TNA5 | P-TNA6 | P-TNA7 |
| 74 | P-TNA248 | P-TNA249 | P-TNA250 | P-TNA251 |
| 75 | P-TNA252 | P-TNA253 | P-TNA254 | P-TNA255 |
| 76 | DISC NAME |||| 
| 77 | DISC NAME ||| LINK INFO |
| 78 | DISC NAME/TRACK NAME ||||
| 79 | DISC NAME/TRACK NAME ||| LINK INFO |
| 80 | DISC NAME/TRACK NAME ||||
| 81 | DISC NAME/TRACK NAME ||| LINK INFO |
| 82 | DISC NAME/TRACK NAME ||||
| 83 | DISC NAME/TRACK NAME ||| LINK INFO |
| 584 | DISC NAME/TRACK NAME ||||
| 585 | DISC NAME/TRACK NAME ||| LINK INFO |
| 586 | DISC NAME/TRACK NAME ||||
| 587 | DISC NAME/TRACK NAME ||| LINK INFO |

Fig. 6

| | 16 bits | | 16 bits | |
|---|---|---|---|---|
| | MSB      LSB | MSB      LSB | MSB      LSB | MSB      LSB |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | cluster H | cluster L | 00000000 | 00000000 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | 00000000 | 00000000 | 00000000 | 00000000 |
| 8 | 00000000 | 00000000 | 00000000 | 00000000 |
| 9 | 00000000 | 00000000 | 00000000 | 00000000 |
| 10 | 00000000 | 00000000 | 00000000 | 00000000 |
| 11 | 00000000 | 00000000 | 00000000 | P-EMPTY |
| 12 | 00000000 | P-TRD1 | P-TRD2 | P-TRD3 |
| 13 | P-TRD4 | P-TRD5 | P-TRD6 | P-TRD7 |
| 14 | P-TRD8 | P-TRD9 | P-TRD10 | P-TRD11 |
| 15 | P-TRD12 | P-TRD13 | P-TRD14 | P-TRD15 |
| 16 | P-TRD16 | | | |
| 17 | | | | |
| 73 | | | | |
| 74 | P-TRD248 | P-TRD249 | P-TRD250 | P-TRD251 |
| 75 | P-TRD252 | P-TRD253 | P-TRD254 | P-TRD255 |
| 76 | RECORD DATE/TIME | | | |
| 77 | | | MAKER CODE | MODEL CODE |
| 78 | RECORD DATE/TIME | | | |
| 79 | | | MAKER CODE | MODEL CODE |
| 80 | RECORD DATE/TIME | | | |
| 81 | | | MAKER CODE | MODEL CODE |
| 82 | RECORD DATE/TIME | | | |
| 83 | | | MAKER CODE | MODEL CODE |
| 84 | RECORD DATE/TIME | | | |
| 85 | | | | LINK INFO |
| 86 | | | | |
| 586 | | | | |
| 587 | | | | LINK INFO |

Fig. 7

| | 16 bits | | 16 bits | |
|---|---|---|---|---|
| | MSB     LSB | MSB     LSB | MSB     LSB | MSB     LSB |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | cluster H | cluster L | 00000000 | 00000000 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | 00000000 | 00000000 | 00000000 | 00000000 |
| 8 | 00000000 | 00000000 | 00000000 | 00000000 |
| 9 | 00000000 | 00000000 | 00000000 | 00000000 |
| 10 | 00000000 | 00000000 | 00000000 | 00000000 |
| 11 | 00000000 | 00000000 | 00000000 | P-EMPTY |
| 12 | 00000000 | P-TNA1 | P-TNA2 | P-TNA3 |
| 13 | P-TNA4 | P-TNA5 | P-TNA6 | P-TNA7 |
| 14 | P-TNA8 | P-TNA9 | P-TNA10 | P-TNA11 |
| 15 | P-TNA12 | P-TNA13 | P-TNA14 | P-TNA15 |
| 16 | P-TNA16 | | | |
| 17 | | | | |
| 74 | P-TNA248 | P-TNA249 | P-TNA250 | P-TNA251 |
| 75 | P-TNA252 | P-TNA253 | P-TNA254 | P-TNA255 |
| 76 | DISC NAME | | | |
| 77 | DISC NAME | | LINK INFO | |
| 78 | DISC NAME OR TRACK NAME | | | |
| 79 | DISC NAME OR TRACK NAME | | LINK INFO | |
| 80 | DISC NAME OR TRACK NAME | | | |
| 81 | DISC NAME OR TRACK NAME | | LINK INFO | |
| 82 | DISC NAME OR TRACK NAME | | | |
| 83 | DISC NAME OR TRACK NAME | | LINK INFO | |
| 84 | DISC NAME OR TRACK NAME | | | |
| 85 | DISC NAME OR TRACK NAME | | LINK INFO | |
| 86 | | | | |
| 586 | DISC NAME OR TRACK NAME | | | |
| 587 | DISC NAME OR TRACK NAME | | LINK INFO | |

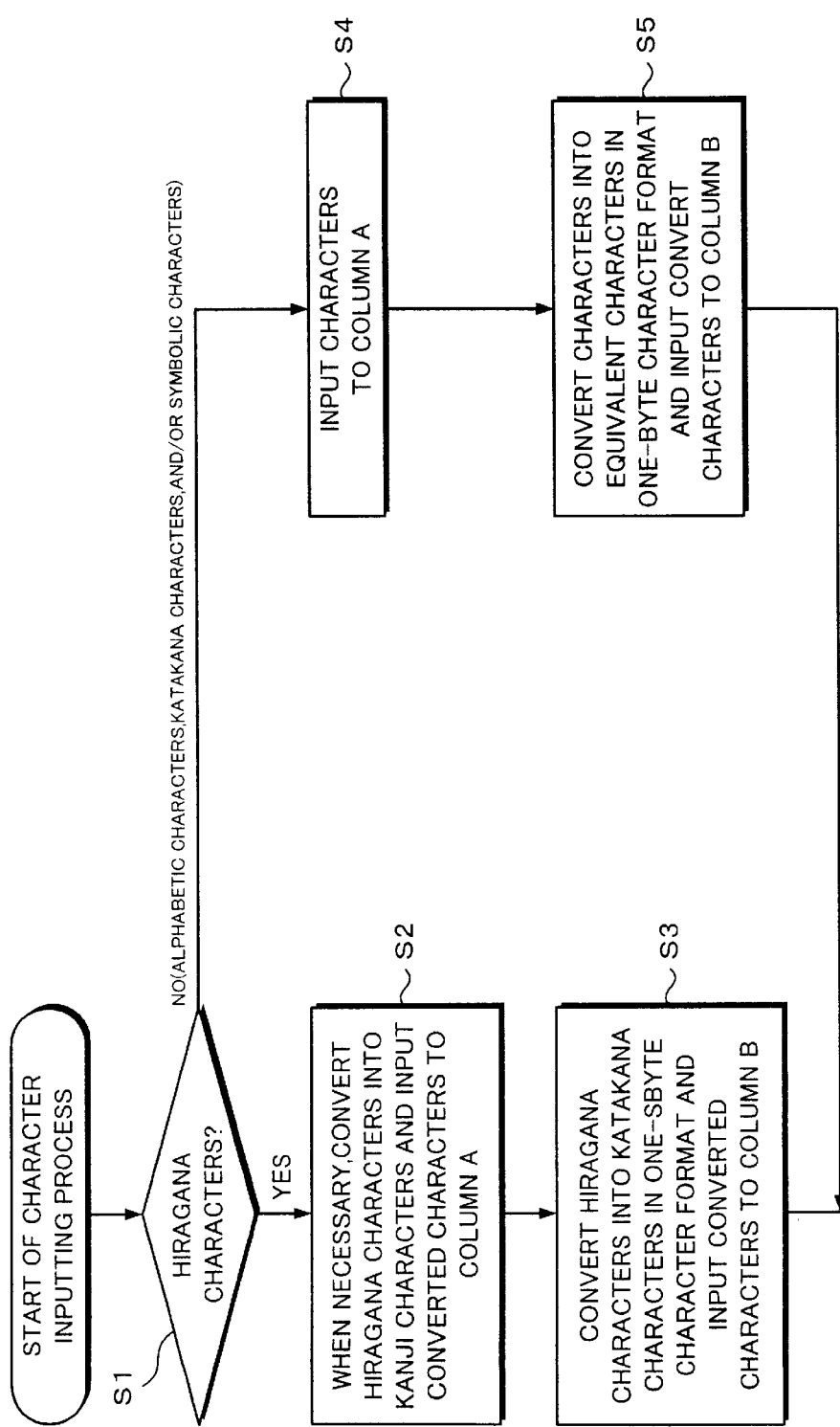

DIGITAL SIGNAL RECORDING/REPRODUCING APPARATUS AND REMOTE CONTROLLING APPARATUS CAPABLE OF DISPLAYING PROGRAM NAMES IN A PLURALITY OF DISPLAY FIELDS USING DIFFERENT CHARACTER SYMBOLS AND RECORDING AND REPRODUCING METHODS THEREOF

BACKGROUND OF THE INVENTION

1. Field of the Invention

The present invention relates to a digital signal recording apparatus and a digital signal reproducing apparatus for recording/reproducing data to/from a digital signal record medium such as a magnetic optical disc. In addition, the present invention relates to a remote controlling apparatus for the digital signal recording apparatus and the digital signal reproducing apparatus and a controlling method for management information thereof.

2. Description of the Related Art

A magnetic optical disc apparatus that records a music program and so forth on a magnetic optical disc such as a MD (Mini Disc, registered trademark) is known. A U-TOC (User Table Of Content) area for managing information such as record position, record date/time, and title name concerned with a recorded program is formed in the inner periphery of such a magnetic optical disc. The U-TOC area is structured as pages. In other words, the U-TOC area has a plurality of sectors. Next, an example of the structure of the U-TOC area will be described.

The U-TOC area is composed of for example 36 sectors. Sector 0 is used to manage start/end addresses of a main program recorded on the magnetic optical disc and start/end addresses of a recordable area thereof. Sector 1 is used to manage a title name of a main program recorded on the magnetic optical disc and a title name of the magnetic optical disc. When audio data is recorded on the magnetic optical disc, a title name is a program name. In addition, a title name of the magnetic optical disc is an album name or a performer's name.

Sector 2 is used to manage record date/time of a program. Sector 4 is used to manage Kanji characters, Hiragana characters, and Katakana characters (these are all Japanese character formats) corresponding to the title name (English characters) of Sector 1. Sectors 3 and 5 to 36 are reserved for future expansions.

Before a program recorded on the magnetic optical disc is reproduced, information is reproduced from the U-TOC area. The reproduced information is stored in a predetermined storing means such as a DRAM of the apparatus in such a manner that the reproduced information correlates with each program recorded on the magnetic optical disc. When a desired program is reproduced, a title corresponding thereto is read from the memory and displayed on a displaying portion.

Since such a conventional magnetic optical disc apparatus has only one character input field on its displaying portion so as to display character information such as a title name and an artist name concerned with a program to be reproduced, both character information recorded in sector 1 of the U-TOC area and character information recorded in sector 4 of the U-TOC cannot be set at a time.

In particular, since the character information recorded in sector 1 of the U-TOC area correlates with the character information recorded in sector 4 (in other words, the relation of original information and translated information such as English (alphabetic characters) and Japanese (Katakana characters), when the title name display area is narrow, similar information should be redundantly input. Thus, such an apparatus is inconvenient for the user.

In the conventional magnetic optical disc apparatus, a title name is read from sector 1 or sector 4 of the U-TOC area corresponding to a mode that has been set by the user and displayed with a font that has been selected by the user. For example, the user can more easily see a title name displayed on the displaying portion in the native language (for example, Japanese) than a foreign language (for example, English). In addition, when an European/American music program is reproduced, the program title is displayed in English. Thus, when alphabetic characters recorded in sector 1 are displayed, Japanese characters such as Kanji characters, Hiragana characters, and Katakana characters recorded in sector 4 are not displayed. In other words, advantages (such as a variety of fonts) of the apparatus cannot be effectively used.

OBJECTS AND SUMMARY OF THE INVENTION

Therefore, an object of the present invention is to provide a digital audio signal recording apparatus that allows character information such as titles of individual programs to be displayed and input in a plurality of character formats (for example, Hiragana characters, Kanji characters, and alphabetic characters). Another object of the present invention is to provide a digital audio signal recording apparatus and a reproducing apparatus thereof that allow character information to be displayed in a plurality of character formats in the reproducing mode and the like.

A first aspect of the present invention is a digital signal recording apparatus, comprising a recording means for rewriting programs and character symbols recorded on a record medium having a program area for recording programs and a management area for managing a plurality of character symbols corresponding to the programs, an operating means for allowing the plurality of character symbols to be input when the character symbols are rewritten by the recording means, a displaying means having a display field corresponding to the plurality of character symbols that are input by the operating means, and a controlling means for causing the recording means to record the plurality of character symbols that are input by the operating means to the management area in such a manner that the plurality of character symbols correlate with the programs.

A second aspect of the present invention is a digital signal reproducing apparatus, comprising a reproducing means for reproducing programs and character symbols from a record medium having a program area for recording programs and a management area for managing a plurality of character symbols corresponding to the programs, a storing means for storing the plurality of character symbols in such a manner that the plurality of character symbols correlate with the programs, and a displaying means having a display field corresponding to the plurality of character symbols that are recorded to the recording means.

A third aspect of the present invention is a remote controlling apparatus, comprising an operating means for inputting a plurality of character symbols that are transmitted to a unit to be controlled, a displaying means having a display field corresponding to the plurality of character symbols that are input by the operating means, a storing means for storing the plurality of character symbols that are input by the operating means, and a transmitting means for transmitting the plurality of character symbols stored in the storing means to the unit to be controlled along with an identifier that represents the unit to be controlled.

A fourth aspect of the present invention is a digital signal recording method, comprising the steps of (a) recording programs and character symbols to a record medium having a program area for recording programs and a management area for managing a plurality of character symbols corresponding to the programs, (b) inputting the plurality of character symbols recorded at step (a), and (c) displaying the plurality of character symbols that are input at step (b) on a predetermined display field.

A fifth aspect of the present invention is a digital signal reproducing method, comprising the steps of (a) reproducing programs and character symbols from a record medium having a program area for recording programs and a management area for managing a plurality of character symbols corresponding to the programs, (b) storing the plurality of character symbols in such a manner that the plurality of character symbols correlate with the programs, and (c) displaying the plurality of character symbols that are recorded at step (b) to a display field.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 3 is a table showing the structure of sector 0 of an U-TOC area for managing a record position of each program;

FIG. 5 is a table showing the structure of sector 1 of the U-TOC area for managing a title name of each program recorded in a first character format;

FIG. 6 is a table showing the structure of sector 2 of the U-TOC area for managing the record date/time of each program;

FIG. 7 is a table showing the structure of sector 4 of the U-TOC area for managing a title name of each program recorded in a second character format;

FIGS. 17A and 17B are flow charts showing a process performed on the remote controlling portion side for automatically inputting character information in a particular character format corresponding to an input operation of character information in another character format of a plurality of character formats.

DETAILED DESCRIPTION OF THE PREFERRED EMBODIMENTS

Figure 1:
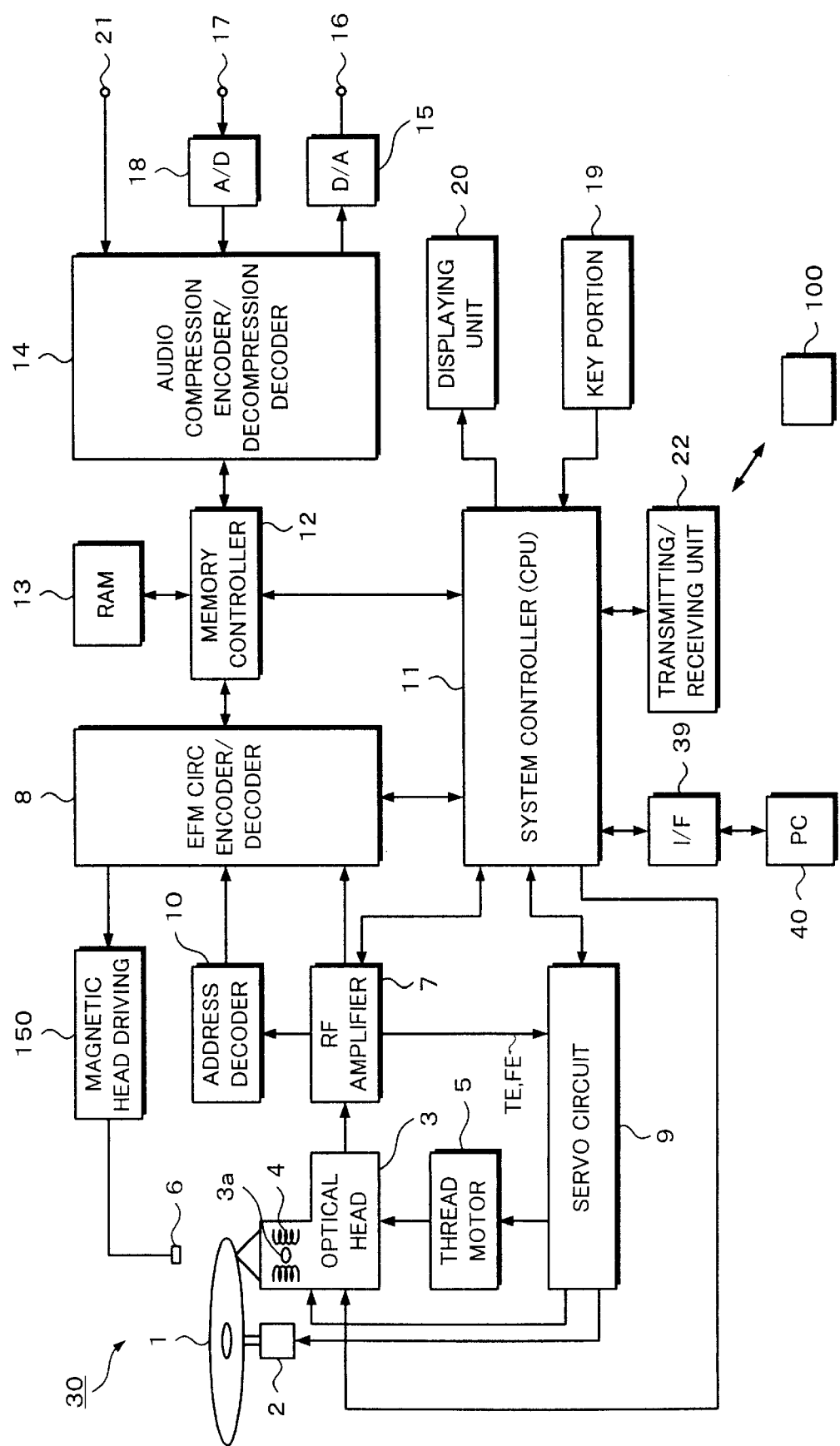
FIG. 1 is a block diagram showing the overall structure of a digital signal recording/reproducing apparatus according to the present invention.

Next, with reference to the accompanying drawings, an embodiment of the present invention will be described. FIG. 1 is a block diagram showing the overall structure of an Mini Disc (hereinafter referred to as MD) apparatus according to an embodiment of the present invention. The diameter of an MD is as small as 64 mm in comparison with 12 cm of a Compact Disc (hereinafter referred to as CD). An MD is a magnetic optical disc that is superior to a CD in portability. The MD apparatus is a magnetic optical disc apparatus that records information on an MD and reproduces information therefrom. Referring to FIG. 1, as will be described later, an MD main unit 30 receives a user's command through a remote controlling portion 100 and outputs information (such as audio information) that the user requires.

An MD 1 is housed in a cartridge with a shutter mechanism. When information is recorded to the MD 1 or reproduced therefrom, the shutter mechanism is opened. In this state, light emitted by an optical pickup is radiated to the MD 1. In addition, a magnetic field generated by a magnetic head is applied to the MD 1. When the MD 1 is loaded to the MD main unit 30 in the recording mode, the reproducing mode, or the like, the MD 1 is rotated at CLV (Constant Linear Velocity) by a spindle motor 2. An optical head 3 and the magnetic head 6 are disposed in the MD main unit 30 in such a manner that the optical head 3 and the magnetic head 6 are oppositely positioned with the MD 1. A thread motor 5 is disposed in the MD main unit 30. The thread motor 5 largely travels the optical head 3 in the radial direction of the MD 1.

The optical head 3 is composed of an objective lens 3a, a two-axis mechanism 4, a semiconductor laser (not shown), and a light receiving portion (not shown). The intensity of laser light emitted from the semiconductor laser is varied between the recording mode and the reproducing mode. The light receiving portion is composed of a plurality of areas. The light receiving portion receives light of which the laser light emitted by the semiconductor laser is reflected by the MD 1 and generates detection signals of the individual areas thereof. The polarization of the reflected light varies corresponding to record information by magnetic Kerr effect. The light receiving portion detects a magnetic field vector corresponding to the variation of the polarization and generates a detection signal corresponding to the detected magnetic field vector. The two-axis mechanism 4 is composed of a focusing coil and a tracking coil. The focusing coil drives the objective lens 3*a* in the direction of which the objective lens 3*a* approaches the record surface of the MD 1 or goes away therefrom. The tracking coil drives the objective lens 3*a* in the radius direction of the MD 1.

Next, the structures and operations of a data reproducing system, a servo system, and a portion that processes a reproduced signal will be described. The detection signals generated by the light receiving portion of the optical head 3 are supplied to an RF amplifier 7. The RF amplifier 7 generates a focus error signal FE, a tracking error signal TE, an RF signal, and a spindle error signal corresponding to the detection signals. The focus error signal FE and the tracking error signal TE are supplied to a servo circuit 9. The RF signal is supplied to an EFM/CIRC encoder/decoder 8 and an address decoder 10. The spindle error signal is supplied to a system controlling portion 11.

The servo circuit 9 compensates the phases of the signals received from the RF amplifier 7 and adjusts the gains thereof. Output signals of the servo circuit 9 are supplied to the focusing coil and the tracking coil of the two-axis mechanism 4 through a drive amplifier (not shown).

The servo circuit 9 has an LPF (Low Pass Filter) (not shown). The tracking error signal TE is supplied to the LPF. Corresponding to the output signal of the LPF, a thread error signal is generated. The thread error signal is supplied to the thread motor 5 through a thread drive amplifier (not shown). The thread motor 5 operates corresponding to the thread error signal.

The EFM/CIRC encoder/decoder 8 performs the following processes corresponding to the RF signal received from the RF amplifier 7. The EFM/CIRC encoder/decoder 8 converts the RF signal into a binary signal and demodulates the binary signal by EFM (Eight to Fourteen Modulation) demodulating process. The EFM demodulating process is a demodulating process for record data that has been EFM-modulated. In addition, the EFM/CIRC encoder/decoder 8 performs an error correcting process corresponding to CIRC (Cross Interleave Reed-Solomon Coding) method for the resultant signal.

Thus, the EFM/CIRC encoder/decoder 8 generates a spindle error signal for controlling the rotation of the MD 1 corresponding to the binary signal corresponding to the RF signal or corresponding to address data extracted by the address decoder 10 and supplies the spindle error signal to the system controlling portion 11. The system controlling portion 11 controls the spindle motor 2 corresponding to the spindle error signal. The EFM/CIRC encoder/decoder 8 controls the operation of a PLL (Phase Locked Loop) thereof corresponding to the binary EFM signal.

The EFM/CIRC encoder/decoder 8 supplies the resultant decoded signal to a memory controller 12. As will be described later, the memory controller 12 writes the output signal of the EFM/CIRC. encoder/decoder 8 to a RAM (Random Access Memory) 13 under the control of the system controlling portion 11. In addition, the memory controller 12 reads a signal from the RAM 13.

The signal that is read from the RAM 13 is supplied to an audio compression encoder/decompression decoder 14. The audio compression encoder/decompression decoder 14 decompresses the received signal that has been compressed corresponding to for example ATRAC (Acoustic TRansferred Adopted Coding) method. The decompressed signal is supplied to a D/A converter 15. The D/A converter 15 converts the received digital data into analog audio signal. The analog audio signal is supplied to an audio outputting means (not shown) through an audio output terminal 16.

As will be described later, grooves have been formed on the MD 1 in a zigzag pattern at a predetermined frequency (for example, 22.05 Hz). Address data that had been FM-modulated has been recorded on the MD 1. The address data decoder 10 extracts the address data corresponding to the RF signal received from the RF amplifier 7. A BPF (Band Pass Filter) that allows only a predetermined frequency to pass is disposed in the address data decoder 10. By FM-demodulating the RF signal received from the BPF, the address data is extracted. The extracted address data is supplied to the EFM/CIRC encoder/decoder 8.

Next, the processes performed by the memory controller 12 will be described in detail. The output signal of the EFM/CIRC encoder/decoder 8 is written to the RAM 13 at a transmission rate of for example, 1.4 Mbits/sec. When the amount of the signal written to the RAM 13 exceeds a predetermined value, the signal is read from the RAM 13 at a lower transmission rate of for example, 0.3 Mbits/sec than the transmission rate in the data writing mode. Since the reproduced signal is temporarily stored to the memory and then output as audio data, the audio data can be prevented from being lost even if a track jump due to an external disturbance (such as vibration) takes place.

When a track jump due to an external disturbance such as vibration takes place, a process for moving the optical head 3 to the address at which such a track jump has taken place is performed. While such a process is being performed, the memory controller 12 reads the signal from the RAM at the low transmission rate and outputs the resultant audio data. Thus, even if the MD main unit 30 stops reproducing data from the MD 1 due to a track jump, when the period of the track jump is less than a predetermined value, the audio data can be prevented from being lost. When the RAM 13 has a storage capacity of for example 4 Mbytes, it can store audio data of up to around 10 seconds. The memory controller 12 is controlled by the system controlling portion 11.

Next, the structure and operation of the recoding system of the MD main unit 30 will be described. An analog signal is output from an analog output terminal of a digital reproducing apparatus such as a CD player. The analog signal is supplied to an A/D converter 18 through an audio input terminal 17. The A/D converter 18 converts the received analog signal into a digital signal. The digital signal is supplied to the audio compression encoder/decompression decoder 14. When a digital signal received from a digital output terminal of a digital reproducing apparatus is input, the digital signal is supplied to the audio compression encoder/decompression decoder 14 through an input terminal 21.

The audio compression encoder/decompression decoder 14 compresses the received digital signal corresponding to a predetermined compressing method such as ATRAC (Acoustic TRansfer Adapted Coding) method. The compressed digital signal is temporarily stored in the RAM 13 through the memory controller 12 at a transmission rate of for example 0.3 Mbits/second. When the memory controller 12 detects that a predetermined amount of the digital signal has been stored in the RAM 13, the memory controller 12 allows the digital signal to be read from the RAM 13.

The digital signal that is read from the RAM 13 is supplied to the EFM/CIRC encoder/decoder 8. The EFM/CIRC encoder/decoder 8 performs the EFM modulating process and the error correcting process corresponding to CIRC encoding method for the digital signal and supplies the resultant signal to a magnetic head driving circuit 150. The magnetic head driving circuit 150 drives an N pole or an S pole of the magnetic head 6 corresponding to the received signal. In addition, the power of the light emitted by the semiconductor laser of the optical head 3 is controlled so that it becomes higher than in the reproducing mode. The surface of the MD 1 is heated up to Curie temperature so that the magnetic field is inverted. In this state, the data is recorded.

The system controlling portion 11 performs various controlling processes concerned with the recording/reproducing operations. For example, the system controlling portion 11 controls the signal process performed by the memory controller 12 with the RAM 13, the spindle controlling process corresponding to the spindle error signal received from the EFM/CIRC encoder/decoder 8, and the encoder/decoder controlling process for the EFM/CIRC encoder/decoder 8.

In addition, the system controlling portion 11 transmits various servo commands to the servo circuit 9 corresponding to user's operations performed through a key portion 19 or a remote controlling portion 100 (that will be described later). Moreover, the system controlling portion 11 causes a displaying portion 20 such as a LCD (Liquid Crystal Display) to display predetermined information such as character information. Examples of information displayed on the displaying portion 20 are still picture, time information (such as total reproduction time of the MD 1, elapsed time of a program that is being reproduced, remaining reproduction time of a program that is being reproduced, and remaining reproduction time of total reproduction time), and track information of a program that is being reproduced. When a disc name, a track name, a program name, and so forth have been recorded on the MD 1, they are also displayed on the displaying portion 20.

Examples of user's operations that are performed or input through the key portion 19 and the remote controlling portion 100 are power on/off commands, cartridge eject command, playback command, pause command, stop command, program selection command, and record command. Information concerned with operations are input from the remote controlling portion 100 and transmitted to the system controlling portion 11 by a predetermined transmitting method using infrared rays or the like. The MD main unit 30 has a transmitting/receiving unit 22 that transmits information to the remote controlling portion 100 and receives information therefrom.

Information that is transmitted from the MD main unit 30 is for example information concerned with programs recorded on the MD 1. When the user selects a program, he or she references such information. Such information is reproduced from a predetermined record area such as a P-TOC (Pre-mastered TOC) area or the U-TOC area recorded on the MD 1. The detail of the P-TOC area will be described later. The reproduced information is supplied to the transmitting/receiving unit 22 by the system controlling portion 11. The user may communicate with the system controlling portion 11 through for example a personal computer 40 and an interface 39 as well as the key portion 19 and the remote controlling portion 100. In this case, software that allows the personal computer 40 to communicate with the system controlling portion 11 and information to be displayed on a monitor screen is required.

Each of the key portion 19 and the remote controlling portion 100 has a function that allows the user to record desired information such as a title of each program to the MD 1. The information that has been recorded on the MD 1 is displayed on the displaying portion 20 while the relevant program is being reproduced.

Information such as a title of each program is recorded in the U-TOC area of the MD 1. The U-TOC area is a record area that is different from a program area. As will be described later, the U-TOC area is composed of a plurality of sectors. In other words, information such as a title of each program is recorded to different sectors depending on whether or not character codes of the information are based on MS-JIS (Microsoft—Japanese Industrial Standard) (such as Kanji characters, Hiragana characters, and Katakana characters in two-byte character format) or ISO (International Standard Organization) 8859-1 (such as alphabetic characters and Katakana characters in one-byte character format). According to the present invention, character data of a title of each program in a plurality of character formats can be input at a time on the same screen of the displaying portion of the remote controlling portion 100.

Figure 2:
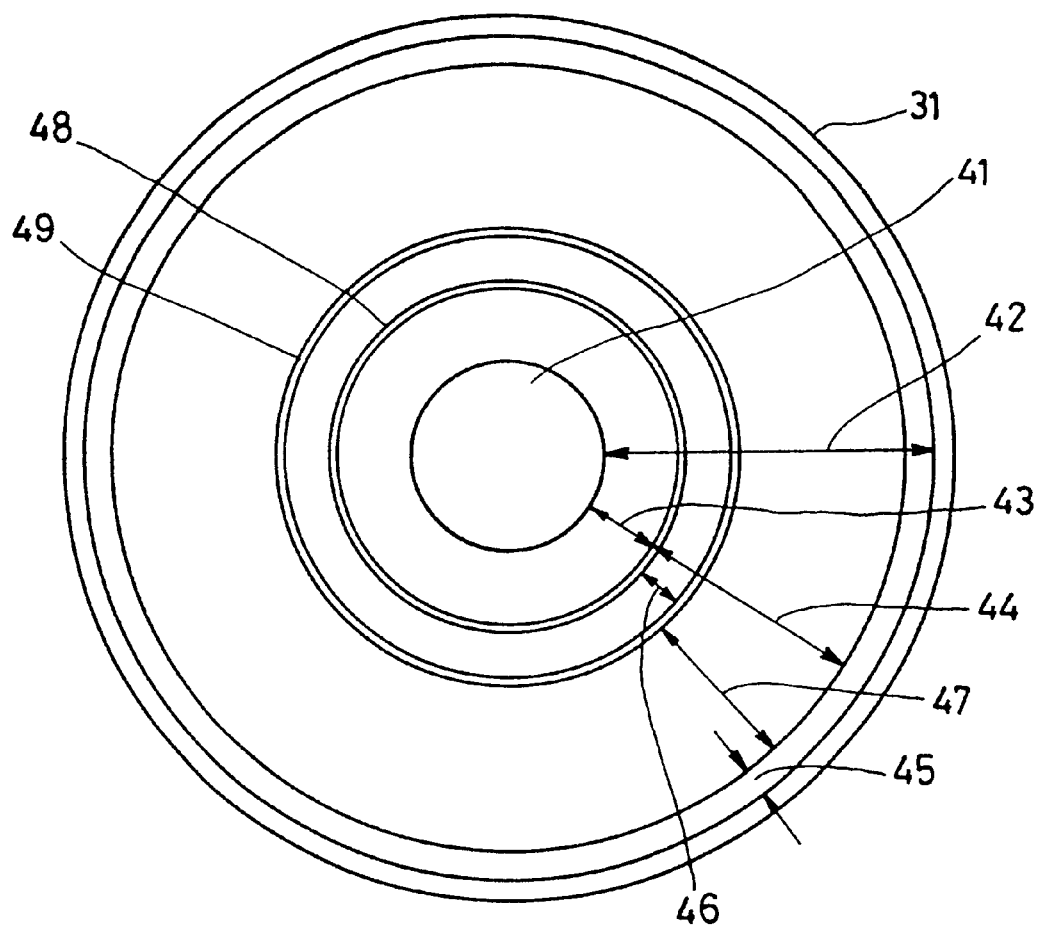
FIG. 2 is a schematic diagram showing the medium format of a rewritable magnetic optical disc.

Next, for easy understanding of te present invention, with reference to FIG. 2, the medium format of the MD 1 will be described. The MD 1 is composed of a polycarbonate substrate and an information film coated thereon. A clamping plate 41 composed of a magnetic substance is disposed at the center of the MD 1. The information film has a data record film and a data reproduction film. The data record film is composed of a dielectric layer, an MO (Magnetic Optical) layer, a dielectric layer, a reflection film, and a protection film that are disposed successively on the substrate. The data reproduction film is composed of a reflection film and a protection film. The area other than the clamping plate 41 of the MD 1 is an information area 42.

A lead-in area 43 is formed on the innermost periphery side of the information area 42. The data reproduction film is coated in the lead-in area 43. In the data reproduction film, information has been recorded as pits. A recordable area 44 is formed outside the lead-in area 43. The data record film is coated in the recordable area 44. A lead-out area 45 is disposed on the outermost periphery of the MD 1. A program area 47 for recording each program is formed outside the recordable area 44. A U-TOC area 46 for recording a U-TOC is formed on the inner periphery side of the recordable area 44. In the U-TOC area 46, information concerned with each program recorded in the program area 47 is recorded.

A calibration area 48 is formed between the lead-in area 43 and the U-TOC area 46 (in other words, on the innermost periphery of the recordable area 44). The calibration area 48 is formed so as to adjust a laser output power in the recording mode. A gap area 49 is formed between the U-TOC area 46 and the program area 47. User data is not recorded in the calibration area 48 and the gap area 49.

A P-TOC has been recorded as pre-pits in the lead-in area 43. In the P-TOC, information such as the start address of the U-TOC area, the laser power value in the recording mode, and the start address of the calibration area 48 has been recorded.

To record/reproduce a program to/from the MD 1, management information (namely, the P-TOC and the U-TOC) that has been recorded on the MD 1 should be read. The system controlling portion 11 determines an address of an area of the MD 1 to/from which a program is recorded/ reproduced corresponding to the management information. The management information is read when the MD 1 is loaded to the MD main unit 30. The management information that has been read from the MD 1 is stored in a predetermined storing means such as a DRAM (not shown). When a program is recorded or reproduced, the management information is referenced.

When data is recorded or erased, the U-TOC is edited and rewritten. Whenever data is recorded/erased, the system controlling portion 11 edits the U-TOC stored in the predetermined storing means. The edited U-TOC is written to the U-TOC area 46 of the MD 1 at predetermined timing (in other words, when the eject command of the MD 1 or the power off command is input). Since the U-TOC information is temporarily stored in the storing means, the storing period of the U-TOC information can be shortened in comparison with the case that the U-TOC information is recorded to the U-TOC area 4 of the MD 1 whenever the U-TOC information is rewritten. Thus, the performance of the MD main unit 30 can be improved. However, whenever the U-TOC information is rewritten, it may be recorded to the U-TOC area 46 of the MD 1.

For easy understanding of the U-TOC information managed in the U-TOC area 46, the data format of the program area 47 will be described. Data is recorded or reproduced as clusters. One cluster is composed of for example 36 sectors. One sector is composed of for example 2352 bytes. The 36 sectors consist of three linking sectors, one sub data sector, and 32 main data sectors.

The CIRC interleave length of the data format of the MD is larger than the length of one sector (for example, 13.3 msec) in the format of a conventional error correcting process used for a CD or the like. To allow one reproducing system to reproduce data recorded on both a CD and an MD, such linking sectors are provided. Thus, meaningful information is not recorded in the linking sectors. In addition, the sub data sector is reserved for a future expansion.

Two sectors are used as one group. One group is divided into for example 11 sound groups. One sound group is composed of for example 424 bytes of data of left and right channels. 11 sound groups are referred to as one sound frame.

As described above, the U-TOC is table-of-content information for managing each program recorded in the program area 47. Next, the U-TOC area 46 for recording the U-TOC will be described. The U-TOC area 46 is composed of for example 32 sectors. Next, sectors 0, 1, 2, and 4 of the 32 sectors will be described. Sectors 3 and 5 to 32 are reserved for future expansions.

Sector 0 is used to manage the start address and end address of each program recorded in the program area 47, copy protect information, and emphasis information. FIG. 3 shows an example of the structure of sector 0. Each of sectors 0, 1, 2, and 3 is composed of 2352 bytes arranged as 588 four-byte slots. The 588 four-byte slots are identified slot 0 to slot 587. In slot 0 to slot 77, a header portion, a cluster H, a cluster L, a maker code, a model code, a first TNO, a last TNO, a sector in-use state, a disc serial number, and a disc ID are successively recorded. The cluster H and the cluster L represent predetermined addresses. The maker code and the model code represent a manufacturer name and a model name of the disc, respectively. The first TNO and the last TNO represent the first and last program numbers, respectively.

In addition, a P-DFA (Pointer for Defective Area), a P-EMPTY (Pointer for Empty slot), a P-FRAM (Pointer for Freely Area), and a relevant table representation data portion are successively recorded. The P-DFA represents the start position of a slot for storing information concerned with the position of a defect that takes place on the MD 1. The P-EMPTY represents the in-use state of a slot. The P-FRA represents the start position of a slot for managing a recordable area. The relevant table representation data portion is composed of P-TNO1, P-TNO2, . . . , and P-TNO255 that represent the start positions of slots corresponding to the individual program numbers.

Slot 78 to slot 587 are slots pointed by the above-described various pointers. Each slot is composed of four bytes. Each slot is used to manage a start address, an end address, a track mode, and link information.

In the MD apparatus according to the present invention, data is not always sequentially recorded on the MD, which is a record medium. In other words, data dispersedly recorded on a record medium can be correctly reproduced. Next, a process for correctly reproducing data dispersedly recorded on a record medium will be described. As described above, data is temporarily stored in the RAM 13. Moreover, in the RAM 13, the data write rate is larger than the data read rate. Thus, the reproducing system can perform the following data processes.

The optical pickup 6 is successively accessed to data that has been dispersedly recorded on the disc. Corresponding to the reproduced signal, the EFM/CIRC encoder/decoder 8 generates reproduced data. The reproduced data is stored in the RAM 13. When data is read from the RAM 13, the data is sequentially arranged and supplied to the audio compression encoder/decompression decoder 14.

Figure 4:
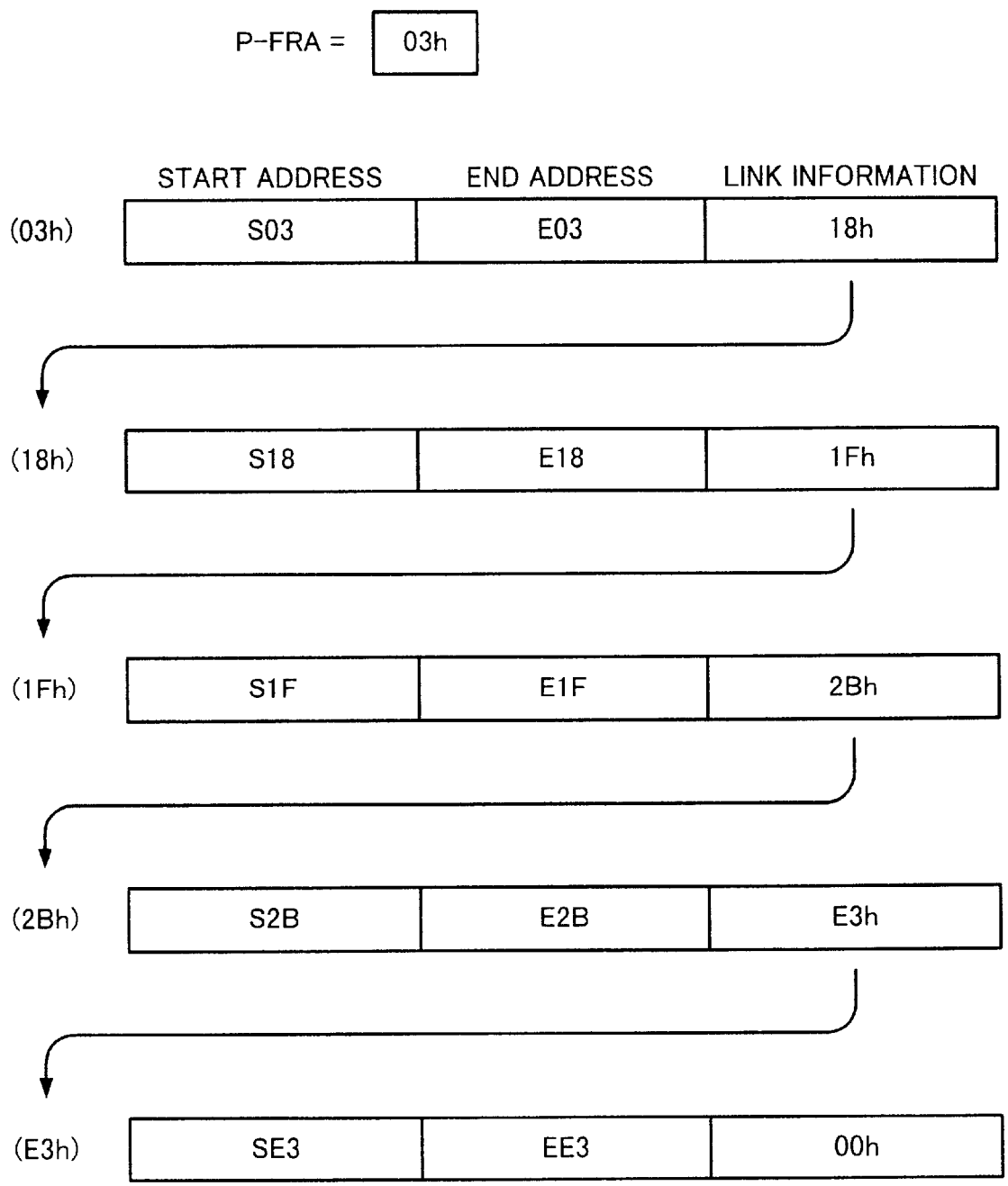
FIG. 4 is a schematic diagram showing a link state of pieces of data dispersedly recorded in a program area of a rewritable magnetic optical disc.

Next, a process for correctly connecting data that has been dispersedly recorded will be described. This process is performed with reference to the P-FRA in sector 0 of the U-TOC. FIG. 4 shows the case that 03h (where h represents hexadecimal notation) is recorded in the P-FRA. In this case, slot 03h is accessed. A start address and an end address recorded in slot 03h represent a start address and an end address of one part recorded on the disc.

Link information recorded in slot 03h represents an address of a slot to be continued. The address of the slot to be continued from slop 03h is 18h. Thus, slot 18h is accessed. Since link information recorded in slot 18h is 1Fh, slot 1Fh is accessed. Corresponding to link information of slot 1Fh, slot 2Bh is accessed. Corresponding to link information of 2Bh, slot E3h is accessed. Until link information of a slot to be continued becomes null (namely, 00h), link information is successively traced.

In such a manner, addresses of data that has been dispersedly recorded are successively obtained. The MD main unit 30 controls the optical pickup 6 and successively accesses such addresses on the MD 1. Thus, when the MD main unit 30 reads data from the RAM 13, the MD main unit 30 can connect data that has been dispersedly recorded.

In the above-described process, data that has been dispersedly recorded is connected with reference to the P-FRA. Alternatively, data that has been dispersedly recorded can be connected with reference to the P-DFA, the P-EMPTY, or the P-TNO1, P-TNO2, . . . , and P-TNO255. In sector 1 of the U-TOC area 46, titles of all programs recorded in the program areas 47 and a disc title of the MD 1 are managed.

When programs recorded on the MD 1 are audio data, the disc title of the MD 1 is an album title, information concerned with a performer, and so forth. The titles of the individual programs are song names. FIG. 5 shows an example of the structure of sector 1 of the U-TOC area 46.

Character information of each program is recorded in a slot of the character table portion corresponding to the relevant table representation data P-TNAx (where x=1 to 255). When the number of characters is large, a plurality of slots are linked with link information. In sector 1 of the U-TOC area 46, available character codes have been defined so that titles are managed with alphabetic characters. However, when the user designates Katakana character input mode, a special code "^" is automatically generated. The alphabetic characters are surrounded by a pair of special codes "^" and managed in sector 1. The alphabetic characters surrounded with a pair of special codes "^" are converted into Katakana characters with a conversion table. With the conversion table, for example, "^a^" is converted into "ア" (Katakana character).

FIG. 6 shows an example of sector 2 of the U-TOC area 46. Sector 2 is used to manage record date/time of each program recorded in the program area 47. FIG. 7 shows an example of sector 4 of the U-TOC area 46. With character codes defined for sector 4, titles of individual programs recorded in the program area 47 can be displayed in Kanji characters, Hiragana characters, and/or Katakana characters.

Figure 8A:
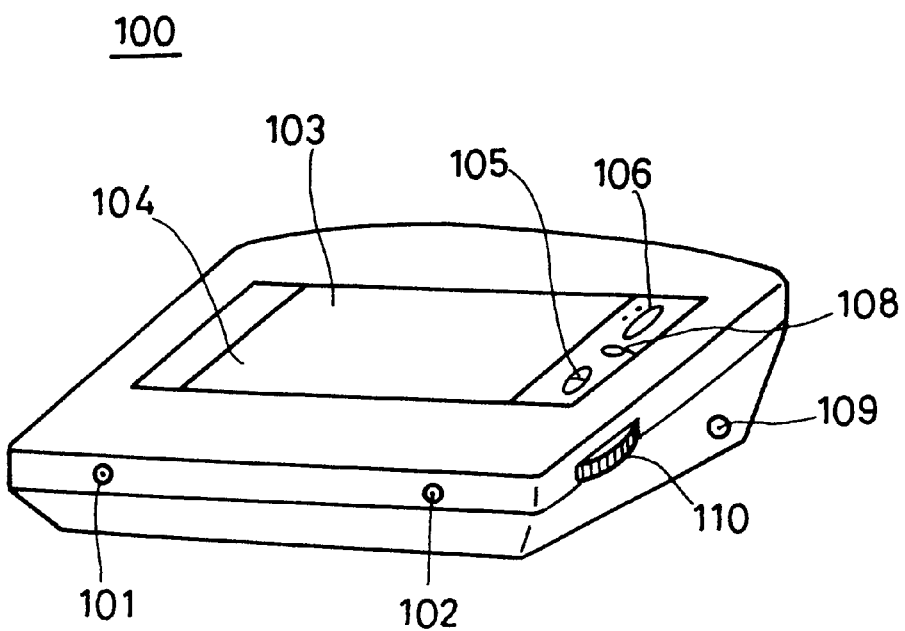
FIG. 8A is an external view showing the structure of a remote controlling portion according to the present invention.

Next, a process for inputting characters such as a title in sector 1 or sector 4 of the U-TOC area 46 will be described. FIG. 8A is an external view showing the external structure of the remote controlling portion 100. The remote controlling portion 100 comprises a commander off button 101, a sleep button 102, a displaying portion 104, a touch panel 103, a volume adjustment button 105, a jog dial knob 106, a muting button 108, a contrast adjustment knob 109, and a brightness adjustment dial 110. The touch panel 103 is additionally disposed on the displaying portion 104.

Figure 8B:
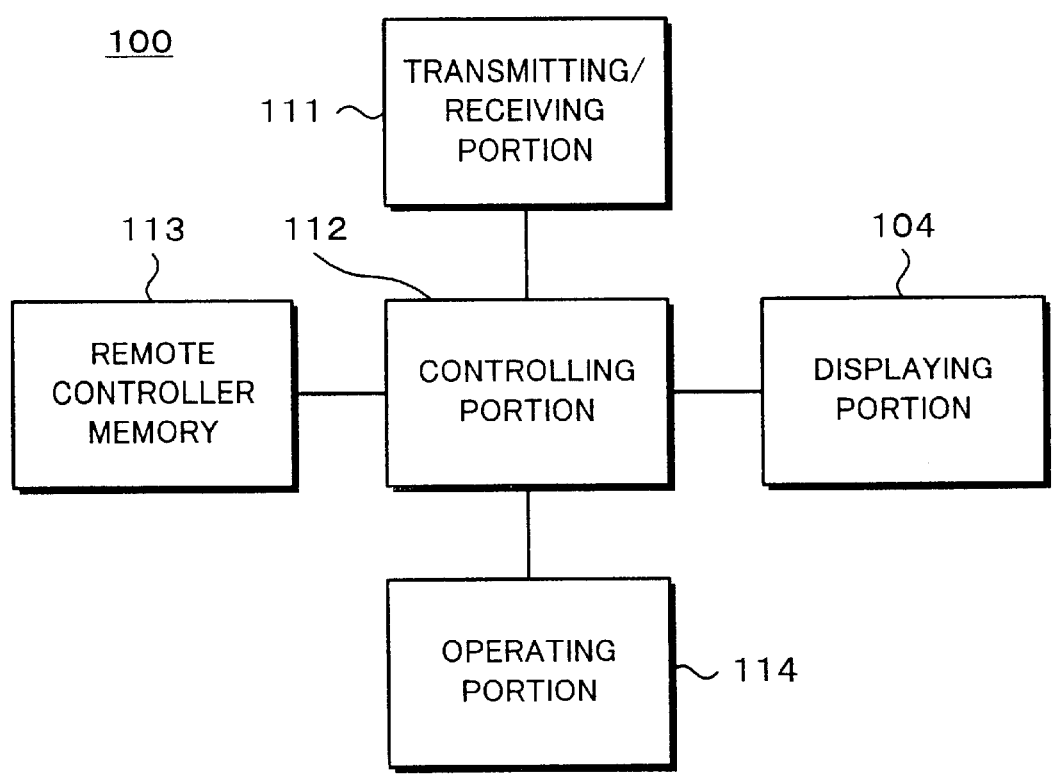
FIG. 8B is a block diagram showing the structure of the remote controlling portion according to the present invention.

FIG. 8B is a block diagram showing the internal structure of the remote controlling portion 100. The remote controlling portion 100 comprises a transmitting/receiving portion 111, a controlling portion 112, a remote controller memory 113, an operating portion 114, and a displaying portion 104. The transmitting/receiving portion 111 transmits/receives data from/to the MD main unit 30 to/from the transmitting/receiving unit 22 with infrared rays or the like. The controlling portion 112 is a microcomputer or the like. The remote controller memory 113 is connected to the controlling portion 112. The operating portion 114 has function keys and character input keys fro selecting an operation object other than MD functions of the MD main unit 30. The displaying portion 104 displays operation information corresponding to a selected function.

The user operates the MD main unit 30 with the operating portion 114 while seeing operation information displayed on the displaying portion 104. The remote controller memory 113 stores a software program necessary for the remote controlling portion 100, user operation information for the operating portion 114, and display information displayed on the displaying portion 104. The transmitting/receiving portion 111 transmits user's operation commands that are input with the operating portion 114. In addition, the transmitting/receiving portion 111 receives control signals and information of character codes from the MD main unit 30 with the transmitting/receiving unit 22 of the MD main unit 30. Next, with reference to FIG. 8A, the operation of the remote controlling portion 100 will be described in detail.

The commander off button 101 is used to prohibit the remote controlling portion 100 from transmitting user's commands to the MD main unit 30. The sleep button 102 is used to cause the MD main unit 30 to enter the sleep mode. The displaying portion 104 is for example an LCD monitor.

The touch panel portion 103, which is additionally disposed on the displaying portion 104, is composed of a plate having a resistor film, an electrostatic film, or the like. On the touch panel portion 103, the resistance varies corresponding to the two-dimensional position. When the user touches the surface of the touch panel portion 103 with an operation part such as a touch pen, a signal for a particular command corresponding to the touched position is generated. Since the touch panel portion 103 fully covers the upper surface of the displaying portion 104, optical characteristics such as transmissivity of light should satisfy predetermined conditions so that the visibility of the displaying portion 104 does not deteriorate.

Since the touch panel portion 103 and the displaying portion 104 are disposed with the relation of the positions thereof, the user can know a position that he or she should touch on the touch panel portion 103 corresponding to data displayed on the displaying portion 104. Data is displayed on the displaying portion 104 with GUI (Graphical User Interface) that is software stored in the remote controller memory 113.

The volume adjustment button 105 is used to adjust the volume level of audio sound that is reproduced. The jog dial knob 106 is used as a selecting means to select a user's command or a program to be reproduced. The muting button 108 is used to muffle an audio output in the reproducing mode. The contrast adjustment knob 109 is used to adjust the contrast of the screen of the displaying portion 103. The brightness adjustment dial 110 is used to adjust the brightness of the screen of the displaying portion 103.

Figure 9:
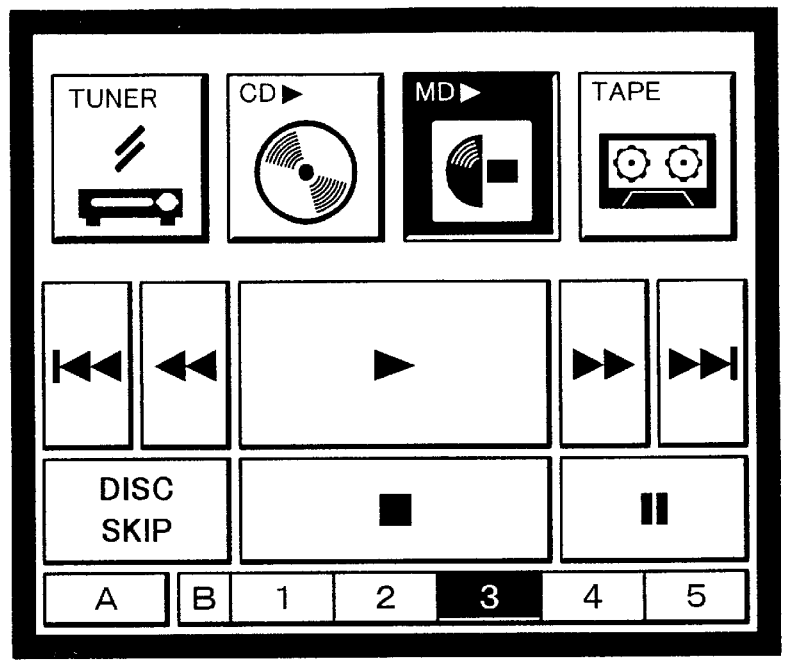
FIG. 9 is a schematic diagram showing a display screen on which each recording/reproducing apparatus is controlled with the remote controlling portion.

Next, with reference to examples of screens displayed on the displaying portion 104, a process for inputting character information such as titles will be practically described. FIG. 9 shows a screen for selecting an object to be controlled. The MD main unit 30 composes an audio recording/reproducing system along with a radio receiver, a CD reproducing unit, a tape recorder, and so forth. Thus, the remote controlling portion 100 can control these units. On the screen shown in FIG. 9, the user touches an icon of a unit to be controlled with the touch pen or the like.

Figure 10:
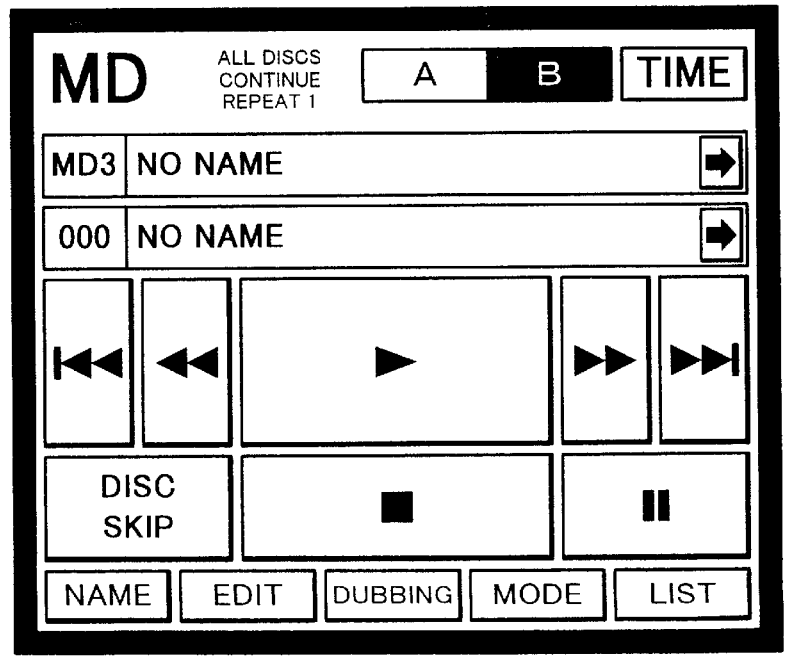
FIG. 10 is a schematic diagram showing a title display screen on which a rewritable magnetic optical disc is operated.

Next, a process performed in the case that the MD main unit has been selected as an object to be controlled will be described. When the icon for the MD main unit has been selected, a screen shown in FIG. 10 is displayed. On the screen shown in FIG. 10, the user can select for example a playback start command, a program skip command, a playback stop command, a pause command, and a disk skip command as playback commands with the touch panel portion 103. In other words, icons for these commands are displayed on the touch panel portion 103. When the user touches a desired icon on the touch panel portion 103 with the predetermined operating means, a command corresponding to the touched icon is sent to the MD main unit 30. The icons for the playback commands are shown in the center to lower regions of the touch panel portion 103.

As shown in FIG. 10, icons for commands other than the playback commands are displayed in a lower region of the touch panel portion 103. Examples of these commands are a character input command (NAME), an edit command (EDIT) for a cut and paste process for each program (namely, audio information), a dubbing command (DUBBING) for recording information of another record medium, a mode selecting command (MODE) for selecting a playback order of programs (such as a repetitive playback mode or a random playback mode), and a list command (LIST) for displaying available programs in a list format.

Figures 11, 12:
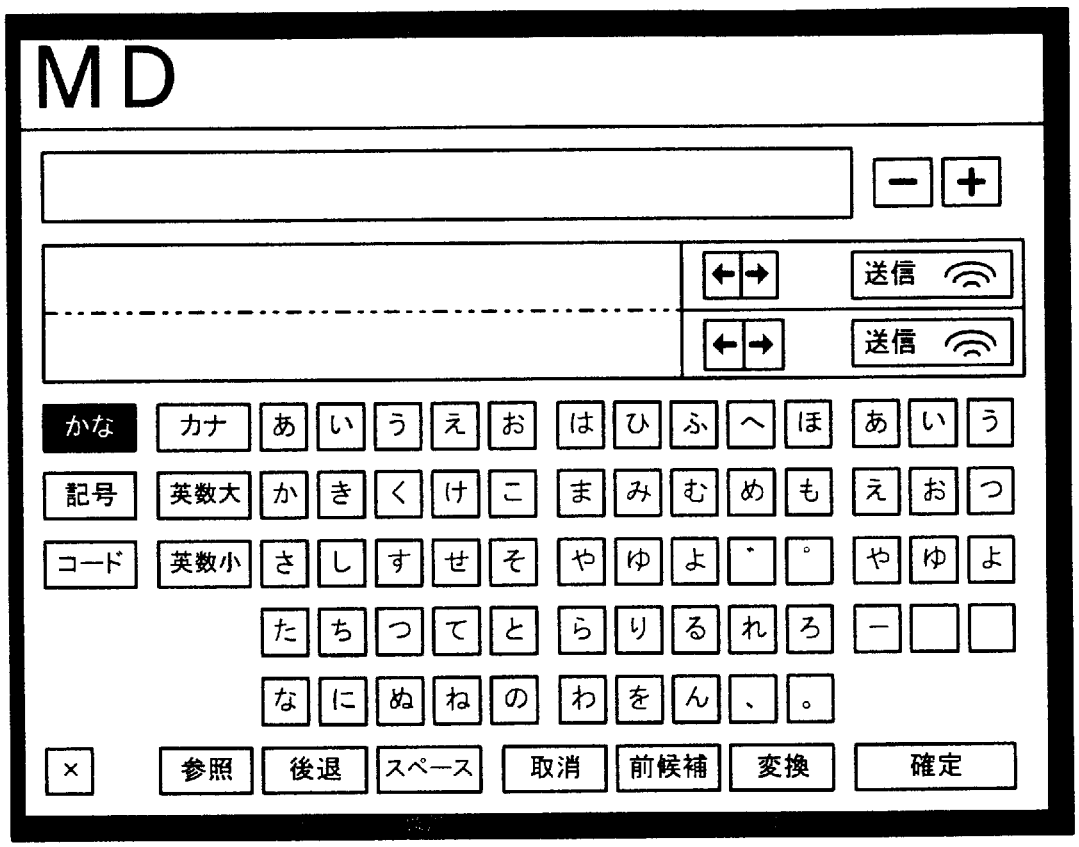
FIG. 11 is a schematic diagram showing a title name input screen on which a rewritable magnetic optical disc is operated.
FIG. 12 is a schematic diagram showing a two-line character input field to which alphabetic characters are input to one line and Hiragana characters are input to the other line so as to operate a rewritable magnetic optical disc.

Since the present invention features a character input function, a process performed in the case that the icon "NAME" is touched on the touch panel portion 103 shown in FIG. 10 and a character input function is selected will be described. FIG. 11 shows an example of the character input screen. On the character input screen, "MD" is displayed at the upper left corner thereof. "MD" represents that the MD main unit has been selected as an object to be controlled. A display field just below "MD" shows a track name, a disc name, or the like that is read from the P-TOC area. "+" and "−" icons on the right of the display field are used to increment/decrement a track number for a desired track. With the selected track number, a desired program can be selected from programs recorded in the program area 47 so as to record character information with the character input function.

Just below the display field, a two-line character input field is displayed. One of the two lines of the character input field shows character information to be recorded in sector 1 of the U-TOC area. The other line shows character information to be recorded in sector 4 of the U-TOC area. Thus, in the above-described structure of the U-TOC area, one line is used to input alphabetic characters or Katakana characters (in one-byte character format), whereas the other line is used to input Kanji characters, Hiragana characters, and Katakana characters (in two-byte character format).

FIG. 12 shows another format of the two-line character input field shown in FIG. 11. In FIG. 12, since a field "Track No" shows "1", it is clear that character information that can be input is for the first program. As the name of the first program, "AIUEO" can be input in alphabetic character format (one-byte character format). In addition, "あいうえお" can be input in Kanji character format (two-byte character format). On the right of the character input field, a field "time" that represents time information is disposed.

In the remote controlling portion 100, the displaying portion 104 has the above-described two-line character input field. Thus, the user can see input characters in two character formats at a time. After confirming the relation of the characters in the two character formats, the user can cause the remote controlling portion 100 to transmit the input characters to the MD main unit. The user can freely designate the relation between characters that are input to the two lines of the character input field. For example, the first line may be used to input a music program title with alphabetic characters, whereas the second line may be used to input the equivalent music program title with Japanese characters. Alternatively, the first line may be used to input a title name, whereas the second line may be used to input an artist name. On the right of the two-line character input field, icons for command for transmitting characters in the individual lines of the character input field are displayed. When the user touches these icons, the characters in the first line of the character input field and the character in the second line thereof are stored in sector 1 and sector 4 of the U-TOC area, respectively.

Alternatively, several program titles in a plurality of formats may be input on one screen. In this case, a plurality of two-line character input fields may be disposed on the displaying portion 104.

The user inputs characters with reference to a keyboard displayed in a lower region of the displaying portion 104 (the keyboard is hereinafter referred to as software keyboard). In FIG. 11, the software keyboard is used to input Hiragana characters. With the software keyboard for Hiragana characters, when the user touches an icon "変換" in a lowest region of the displaying portion, he or she can convert Hiragana characters into Kanji characters. As described above, Hiragana characters and Kanji characters that are input on the screen shown in FIG. 11 are recorded in sector 4 of the U-TOC area. In addition, when the user touches icons "かな (Hiragana characters)", "カナ (Katakana characters)", "記号 (Symbolic characters)", "英数大 (Uppercase alphabetic characters", "コード (Codes)", or "英数小 (Lowercase alphabetic characters" in a left region of the screen, he or she can select a desired character format.

Figure 13:
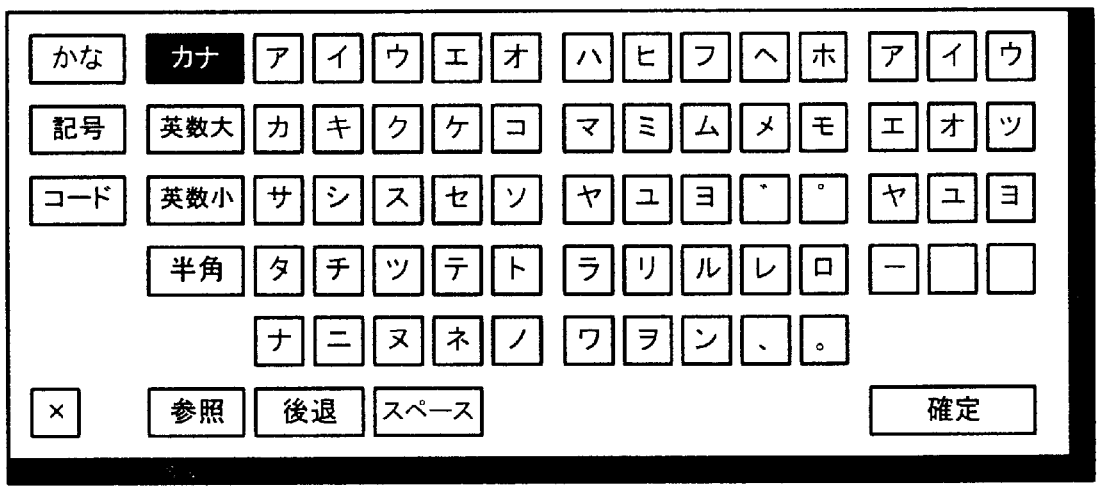
FIG. 13 is a schematic diagram showing a software keyboard displayed in the case that a "Kana character" display mode has been selected as a character input screen.
Figure 14:
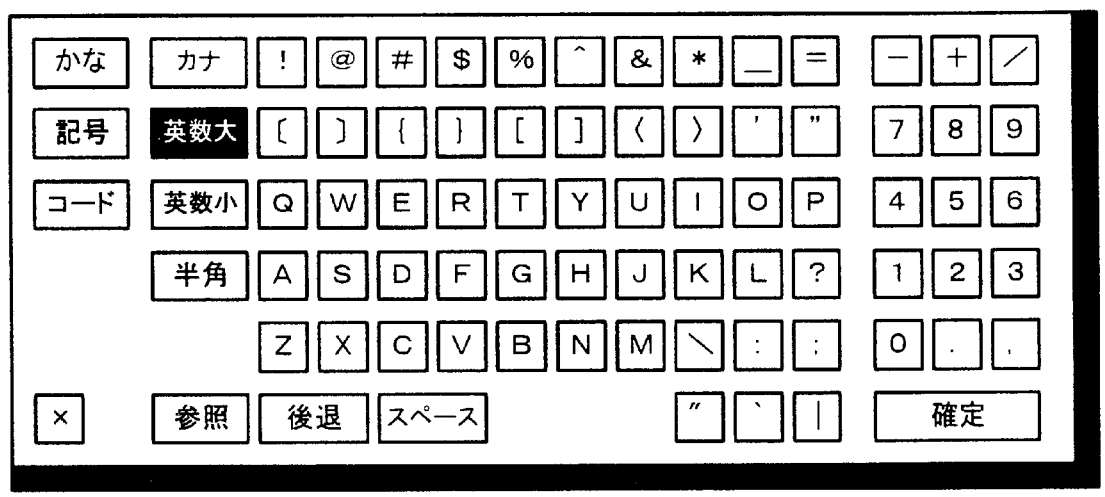
FIG. 14 is a schematic diagram showing a software keyboard displayed in the case that an "Uppercase alphabetic character" display mode has been selected as a character input screen.
Figure 15:
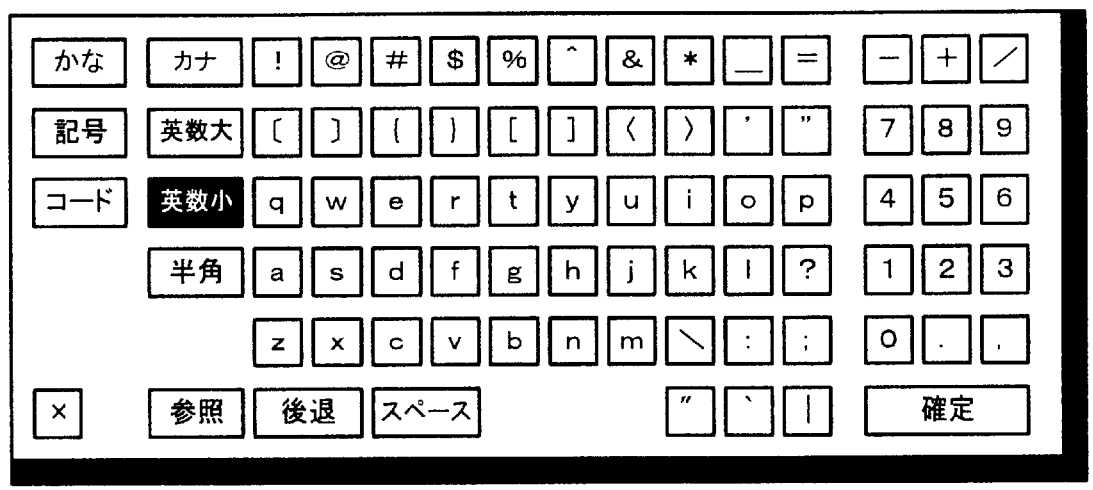
FIG. 15 is a schematic diagram showing a software keyboard displayed in the case that a "Lowercase alphabetic character" display mode has been selected as a character input screen.
Figure 16:
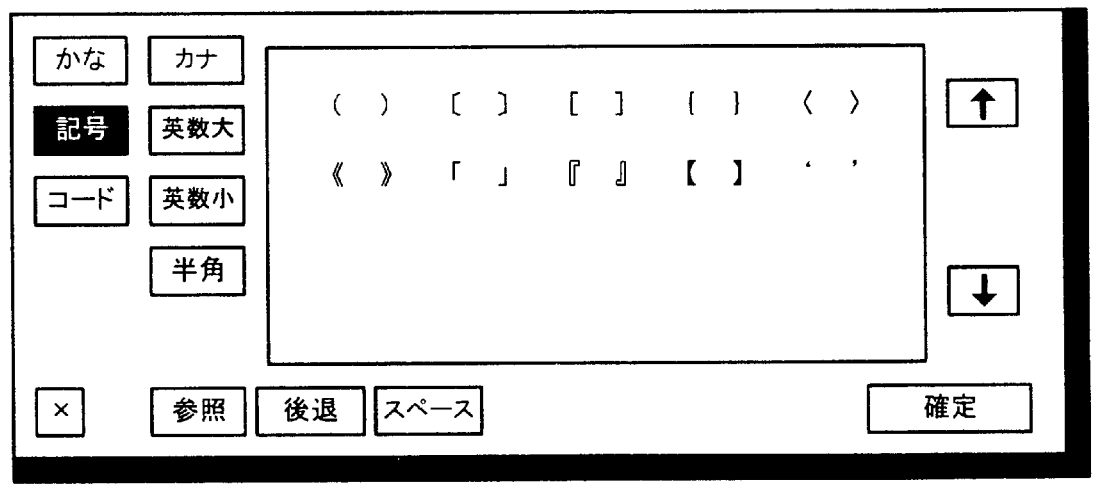
FIG. 16 is a schematic diagram showing a software keyboard displayed in the case that a "Symbolic character" display mode has been selected as a character input screen.

FIG. 13 shows an example of a software keyboard displayed in the case that the user touches the icon "カナ" on the screen. The software keyboard shown in FIG. 13 is used to input Katakana characters in two-byte character format. Katakana characters in two-byte character format are recorded in sector 4 of the U-TOC area. On the other hand, Katakana characters in one-byte character format are recorded in sector 1 of the U-TOC area. FIG. 14 shows an example of a software keyboard displayed in the case that the user touches the icon "英数大" on the screen. FIG. 15 shows an example of a software keyboard displayed in the case that the user touches the icon "英数小" on the screen. FIG. 16 shows an example of a software keyboard displayed in the case that the user touches the icon "記号" on the screen. Uppercase alphabetic characters, lowercase alphabetic characters, and symbolic characters are recorded in sector 1 of the U-TOC area.

In the above-described embodiment, characters are separately input to two lines of the character input field. When characters in a first character format are input to one line of the character input field, they may be automatically converted into equivalent characters in a second character format and then the characters in the second format may be input to the other line of the character input field. With reference to a flow chart shown in FIG. 17, this process will be described as a second embodiment of the present invention. The hardware structure of the second embodiment of the present invention is the same as that of the first embodiment of the present invention. In the following description, character information is input with a means similar to the remote controlling portion 100. However, the inputting means for character information may be the key portion of the MD main unit 30 or a personal computer.

Figure 17B:
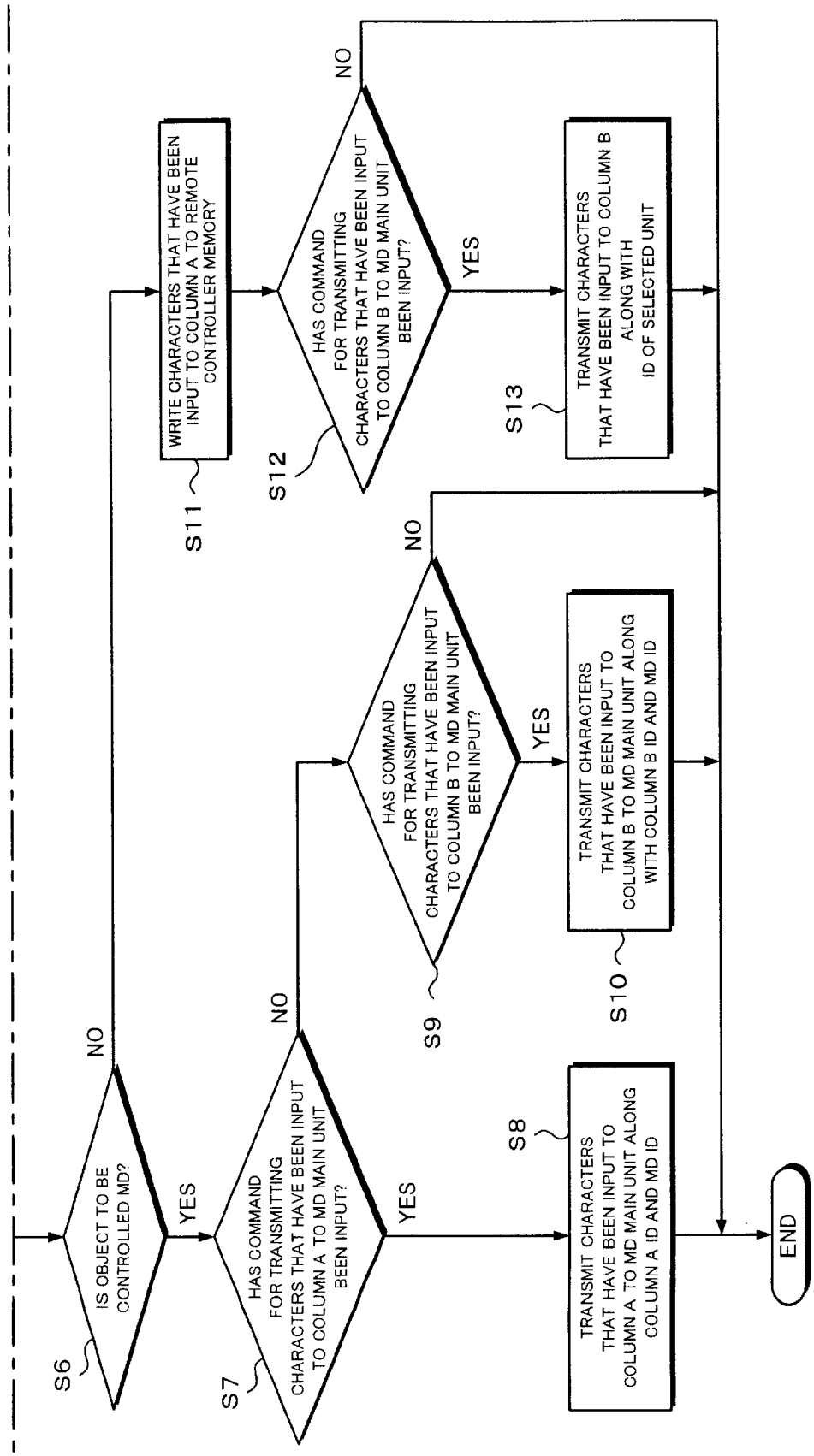

In a character inputting process of the remote controlling portion 100 shown in FIG. 17, a character type is selected at step S1. When Hiragana has been selected, the flow advances to step S2. Otherwise, the flow advances to step S4. At step S2, when necessary, the Hiragana characters are converted into Kanji characters. The resultant characters are input to an input column for character information to be recorded to sector 4 of the U-TOC area (this input column is hereinafter referred to as column A). At step A3, the Hiragana characters that have been input to the column A are automatically converted into Katakana characters in one-byte character format. The converted characters are input to an input column for character information to be recorded in sector 1 of the U-TOC area (this input column is hereinafter referred to as column B).

At step S4, alphabetic characters, Katakana characters, or symbolic character are input. In this case, since it is not necessary to convert the input characters into Kanji characters, the input characters are directly input to the column A. At step S5, the input characters are converted into equivalent characters in one-byte character format and then input to the column B. In other words, at steps S3 and S5, characters that have been input to the column A at steps S2 and S4 are converted into equivalent characters in one-byte character format and then input to the column B, respectively.

At step S6, it is determined whether or not an object to be processed is an MD. When the object is an MD, the flow advances to step S7. Otherwise, the flow advances to step S11.

At step S7, it is determined whether or not a command for transmitting the characters that have been input to the column A to the MD main unit has been input. When the command has been input, the characters that have been input to the column A are transmitted to the MD main unit along with a column A identifier and an MD identifier. Thereafter, the character input process is completed. When the command has not been input, the flow advances to step S9.

At step S9, it is determined whether or not a command for transmitting the characters that have been input to the column B to the MD main unit has been input. When the command has been input, the characters that have been input to the column B are transmitted to the MD main unit along with a column B ID an MD ID. Thereafter, the character inputting process is completed. When the command has not been input, the character inputting process is terminated.

On the other hand, when the object to be processed is not an MD, a process for another unit such as a CD or a tuner is performed. In this case, the characters that have been input to the column A at step S11 are stored in the remote controller memory (see FIG. 8A) of the remote controlling portion 100. At step S12, it is determined whether or not a command for transmitting the characters that have been input to the column B to the MD main unit has been input. When the command has been input, the flow advances to step S13. At step S13, the characters that have been input to the column B are transmitted to the MD main unit along with an ID of the selected unit. When the command has not been input, the character inputting process is terminated.

When characters are input to the column A, equivalent characters thereto are input to the column B. On the other hand, when characters are input to the column B at first, no characters have been input to the column A. Thus, to prevent characters in both the columns A and B from being redundant (Hiragana characters (Kanji characters) or Katakana characters in one-byte character format), the user can input characters to the column B at first. Alternatively, when characters are input to the column B at first, equivalent characters thereto may be input to the column A.

Figure 18:
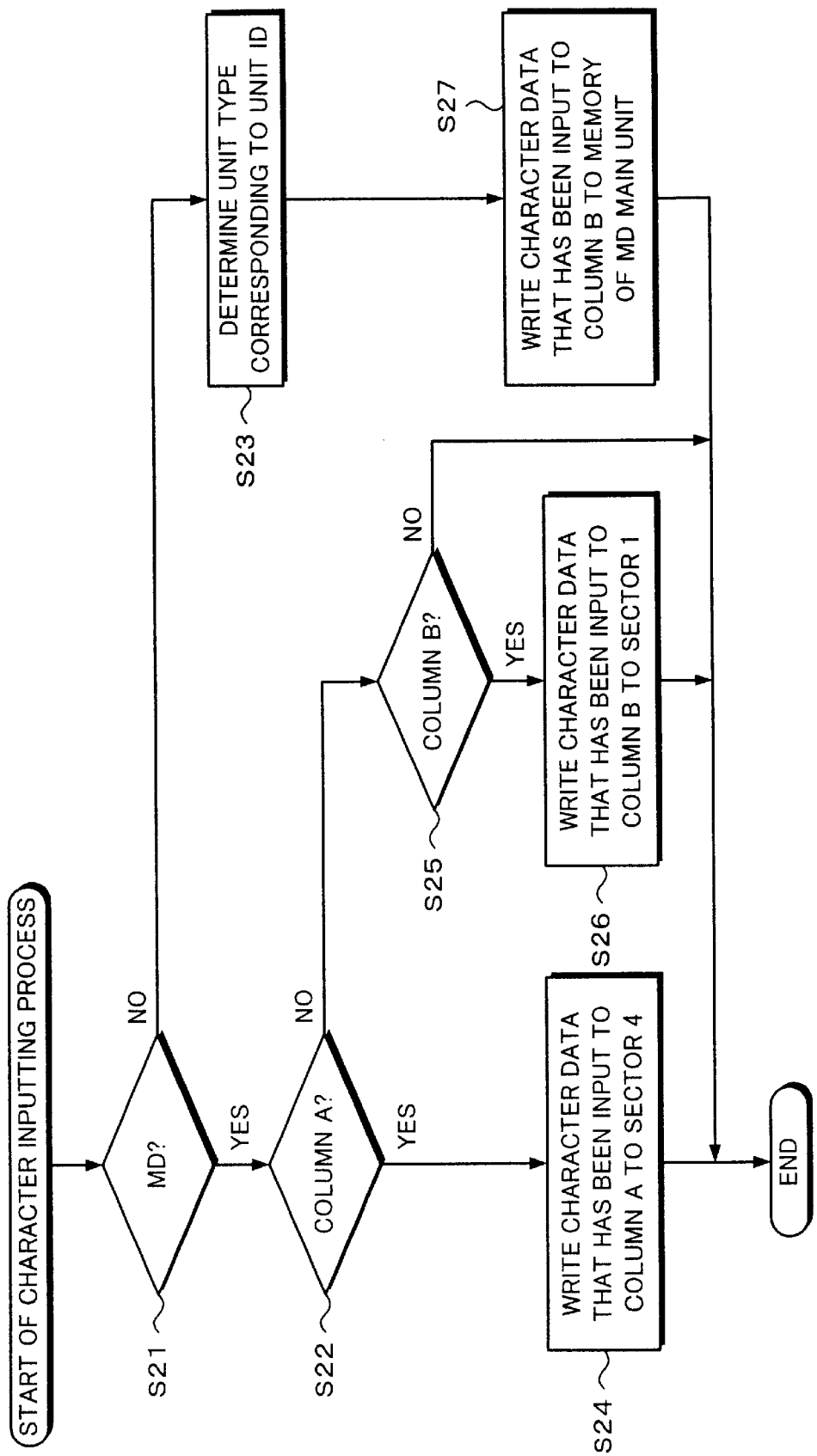
FIG. 18 is a flow chart showing a process performed on the recording/reproducing apparatus side for automatically inputting character information in a particular character format corresponding to an input operation of character information in another character format of a plurality of character formats.

Next, with reference to a flow chart shown in FIG. 18, a character writing process for an MD will be described. After a signal is received from the remote controlling portion 100, at step S21, the unit ID contained in the received signal is determined. When the unit ID represents an MD, the flow advances to step S22. Otherwise, the flow advances to step S23.

At step S22, it is determined whether or not the received signal is character data that has been input to the column A corresponding to the A/B column ID. When the received signal is character data that has been input to the column A, the flow advances to step S24. Otherwise, the flow advances to step S25. At step S24, the character data that has been input to the column A is written to sector 4 of the U-TOC area of the MD. Thus, the character writing process for the MD is completed.

At step S25, it is determined whether or not the received signal is character data that has been input to the column B corresponding to the A/B column ID. When the received signal is character data that has been input to the column B, the flow advances to step S26. At step S26, the character data that has been input to the column B is written to sector 1 of the U-TOC area of the MD. When the received signal is not character data that has been input to the column B, the character writing process for the MD is completed.

When the unit ID does not represent an MD at step S23, the selected unit is determined corresponding to the unit ID. Thereafter, the flow advances to step S27. At step S27, the character data that has been input to the column B is written to a predetermined memory of the MD main unit (this memory is referred to as main unit memory). Thus, the character writing process for the selected unit other than the MD is completed.

In the first and second embodiments of the present invention, characters can be input in two types of formats corresponding to sectors 1 and 4 of the U-TOC area. Alternatively, by changing or expanding the structure of the U-TOC area, characters in three or more formats may be input. For example, in addition to languages such as Japanese, Korean, Arabian, and so forth, phonetic characters that represent pronunciation of such languages may be denoted by alphabetic characters.

As a plurality of character formats, besides a combination of Japanese and English, a desired combination of languages (such as a combination of English and Spanish, a combination of German and French, or a combination of Chinese and Japanese) may be used. Alternatively, a combination of different fonts may be used.

In the embodiments of the present invention, characters in different language formats are input in a two-line character input field. In addition, a plurality of character formats of the same language (for example, Kanji characters, Hiragana characters, and Katakana characters) are input. Alternatively, with a character input field having three or more lines, a plurality of language formats or a plurality of character formats may be input in the character input field having three or more lines.

The present invention can be applied to a recording apparatus and a reproducing apparatus that record/reproduce digital video data as well as digital audio data. In addition, the present invention can be applied to a recording apparatus and a reproducing apparatus that use a record medium such as a tape shaped record medium or a semiconductor memory.

As described above, in the recording/reproducing apparatus that records/reproduces a digital audio signal (such as an MD apparatus) according to the present invention, character data such as titles of individual programs in a plurality of character formats such as Hiragana characters, Kanji characters, and alphabetic characters that are recorded in different sectors of the U-TOC area can be input on the same screen of a remote controlling portion or the like.

Thus, since the user can see input characters in a plurality of character formats, after confirming the relation therebetween, he or she can transmit character data to be recorded to a record medium to the apparatus. Thus, the user can easily and securely input character data such as titles of programs in a plurality of character formats (for example, alphabetic characters and equivalent Katakana characters).

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A remote controlling apparatus, comprising:

operating means for inputting a group of character symbols in at least two different character formats;

displaying means responsive to the operating means for displaying each input group of character symbols in each of the at least two different character formats;

first storing means for storing the input group of character symbols in the at least two different character formats;

transmitting means for transmitting the input group of character symbols in the at least two different character formats to an audio recording/reproducing system to be controlled along with an identifier that represents the audio recording/reproducing system to be controlled; and controlling means for controlling the operating means, the displaying means, the first storing means, and the transmitting means.

2. The remote controlling apparatus as set forth in claim 1, wherein the recording/reproducing system to be controlled has:

receiving means for receiving the at least two different character formats that each correspond to the same input group of character symbols and the identifier from said transmitting means;

identifying means for identifying the identifier received by said receiving means; and second storing means for storing the at lest two different character formats that each correspond to the same input group of character symbols received by said receiving means, wherein said second storing means stores the at least two different character formats that each correspond to the same input group of character symbols corresponding to the identifier identified by said identifying means.

3. The remote controlling apparatus as set forth in claim 1, wherein said controlling means automatically provides each input character symbol that is input by said operating means in each of the at least two different formats.

4. The remote controlling apparatus as set forth in claim 1, wherein said transmitting means is controlled by said controlling means to transmit a command for causing the audio recording/reproducing system to be controlled to reproduce a program corresponding to each input group of character symbols in each of the at least two different character formats.

5. The remote controlling apparatus as set forth in claim 1, wherein said transmitting means is controlled by said controlling means to transmit a command for causing the audio recording/reproducing system to be controlled to rewrite each input group of character symbols in each of the at least two different character formats.

6. The remote controlling apparatus as set forth in claim 1, wherein said operating means is character inputting means connected to the audio recording/reproducing system to be controlled through a predetermined interface.

7. The remote controlling apparatus as set forth in claim 1, wherein said operating means is a touch panel overlying said display means.

8. The remote controlling apparatus as set forth in claim 1, wherein said displaying means displays at least a title of the record medium loaded to the audio recording/reproducing system to be controlled.

9. The remote controlling apparatus as set forth in claim 1, wherein said displaying means displays at least a title of each program recorded on the record medium loaded to the audio recording/reproducing system to be controlled.

10. The remote controlling apparatus as set forth in claim 1, wherein said displaying means displays at least an artist name of the record medium loaded to the audio recording/reproducing system to be controlled.

11. The remote controlling apparatus as set forth in claim 1, wherein each of the at least two different character formats that each correspond to the same input group of character symbols are in different languages.

12. The remote controlling apparatus as set forth in claim 1, wherein each of the at least two different character formats that each correspond to the same input group of character symbols are in the same language.

* * * * *

UNITED STATES PATENT AND TRADEMARK OFFICE
CERTIFICATE OF CORRECTION

PATENT NO.    : 6,392,964 B2
DATED         : May 21, 2002
INVENTOR(S)   : Tomohiro Koyata et al.

It is certified that error appears in the above-identified patent and that said Letters Patent is hereby corrected as shown below:

Column 5,
Line 67, delete ".".

Column 8,
Line 30, change "te" to -- the --.

Column 10,
Line 47, change "slop" to -- slot --.

Column 11,
Line 50, change "fro" to -- for --.

Column 13,
Lines 3 and 4, connect the paragraph ending on line 3 with the paragraph beginning on line 4.

Column 17,
Line 21, insert -- audio -- between "the" and "recording";
Line 29, change "lest" to -- least --;
Line 43, insert -- character -- before "formats".

Column 18,
Line 20, change "display" to -- displaying --.

Signed and Sealed this

Sixth Day of May, 2003

JAMES E. ROGAN
*Director of the United States Patent and Trademark Office*